No. 781,568. PATENTED JAN. 31, 1905.
W. C. STEVENS.
CABLE LAYING IMPLEMENT.
APPLICATION FILED SEPT. 1, 1903. RENEWED JULY 11, 1904.
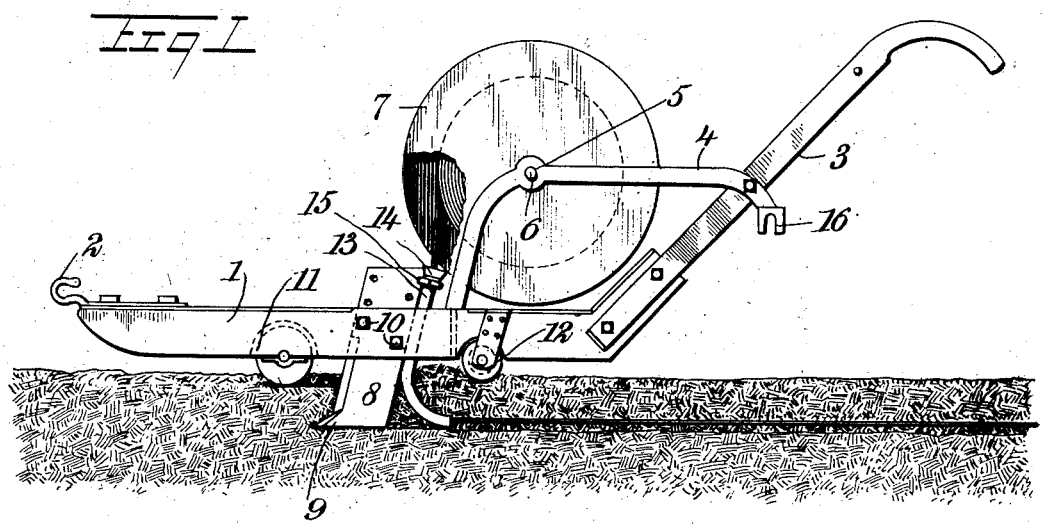
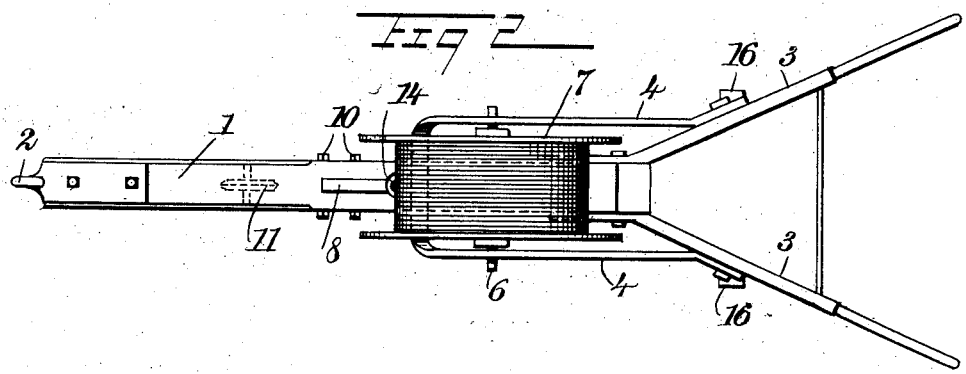
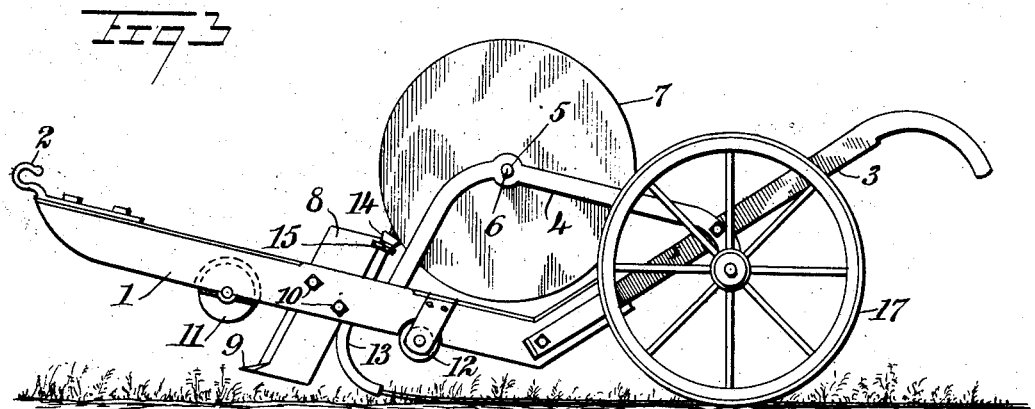
WITNESSES:
H. Walker
C. R. Furgason
INVENTOR
Walter C. Stevens
BY
ATTORNEYS No. 781,568. Patented January 31, 1905.

UNITED STATES PATENT OFFICE.

WALTER CLARENCE STEVENS, OF MELROSE, MASSACHUSETTS.

CABLE-LAYING IMPLEMENT.

SPECIFICATION forming part of Letters Patent No. 781,568, dated January 31, 1905.

Application filed September 1, 1903. Renewed July 11, 1904. Serial No. 216,055.

*To all whom it may concern:*

Be it known that I, WALTER CLARENCE STEVENS, a citizen of the United States, and a resident of Melrose, in the county of Middlesex and State of Massachusetts, have invented a new and Improved Cable-Laying Implement, of which the following is a full, clear, and exact description.

This invention relates to improvements in implements for laying electric cables or conductors either on the surface or below the surface of the ground, an object being to provide a device of this character by means of which cables or the like may be quickly laid and covered when under ground, thus making the device particularly useful in military operations and for private and municipal uses.

I will describe a cable-laying implement embodying my invention and then point out the novel features in the appended claims.

Reference is to be had to the accompanying drawings, forming a part of this specification, in which similar characters of reference indicate corresponding parts in all the figures.

Figure 1 is a side elevation of a cable-laying implement embodying my invention. Fig. 2 is a plan view thereof, and Fig. 3 is a side elevation showing the arrangement of the implement when laying the cable or the like on the ground surface.

The implement comprises a beam 1, having its forward end curved upward, as indicated, so that it may be readily drawn over the surface of the ground, and this end is also provided with a hook 2, to which a draft-chain or the like may be attached. Attached to the rear upwardly-projecting end of the beam are handles 3, which between their upper and lower ends are rigidly connected to the beam by means of a frame consisting of side bars 4, which at the forward ends are curved downward to connect with said beam. These side bars 4 have bearings 5 for a rod 6, on which a reel 7 may be placed to rotate.

Adjustable vertically through an opening in the plow-beam is a trenching blade or plow 8, the lower end of which at the front is provided with an inclined cutting-tooth 9. By making the trenching-blade adjustable vertically it is obvious that it may be regulated for any desired depth of trench within certain limits, and it may be held as adjusted by means of bolts 10, passing through openings in the beam and through openings in the blade. Supported in the beam forward of the blade 8 is a sod-cutting disk 11. The upper portion of this cutting-disk 11 projects into a recess formed in the under side of the beam, and rearward of the blade 8 is a covering-roller, 12, the length of which is substantially equal to the width of the beam. Adjustable vertically through the beam just rearward of the blade 8 is a guide for the cable to be laid. As here shown, this guide consists of a tube 13 having a funnel-shaped top 14 and a rearwardly-curved lower end. This lower end, it will be understood, when the machine is in operation will be substantially on a plane with the lower end of the blade 8. The guide may be held as adjusted with the cutter by means of a set-nut 15 on the guide and engaging in a slot in the back upper corner of the plow or cutter 8.

In operation as the implement is drawn over the ground the disk 11 will cut through the sod or hard upper surface of the ground, so that the following blade 8 may readily cut the trench to the required depth. As the implement moves along the cable or other conductor will be fed off of the reel and passed through the guide to the bottom of the trench. The roller 12, following the guide, will force the loose dirt back into the trench, thus effectually hiding or covering the cable. In some instances it may be desired to lay the cable on the surface of the ground. In such case obviously the blade is to be elevated, so as not to engage with the ground. For this purpose the rear ends of the side bars 4 are extended rearward of the handles 3 and are provided with bearings 16 to receive the axle of wheels 17.

When it is desired to place a new reel of cable or the like in place, the rod or shaft 6 may be drawn out to remove the old reel and then passed through the new reel.

Having thus described my invention, I claim as new and desire to secure by Letters Patent—

1. A cable-laying implement, comprising a beam, a vertically-adjustable trench-cutting blade carried by said beam, a vertically-adjustable cable-guide rearward of the blade, and means for supporting a reel above the beam.

2. A cable-laying implement comprising a beam, a sod-cutting disk carried by said beam, a trench-cutting blade carried by the beam rearward of the sod-cutter, a cable-guide carried by the beam rearward of the said blade, the said blade and guide being vertically adjustable, and means for supporting a cable-reel above the beam.

3. A cable-laying implement comprising a beam, a sod-cutting disk carried by the beam, a vertically-adjustable trench-cutting blade carried by the beam rearward of the sod-cutter, a covering-roller rearward of the blade, a cable-guide between said covering-roller and the blade, and means for supporting a reel above the beam.

4. A cable-laying implement comprising a beam, a sod-cutter carried by said beam, a trenching-blade carried by said beam and adjustable vertically therein, a guide-tube carried by the beam and having its lower end curved rearward, a covering-roller rearward of the guide-tube, and means for supporting a reel above the beam.

5. A cable-laying implement comprising a beam, a sod-cutter carried by the beam, a trenching-blade carried by the beam, a covering-roller carried by the beam, a curved guide-tube carried by the beam, handles extended upward from the rear end of the beam, bars connecting said handles with the beam, the said bars having bearings for a reel, supporting-rod bearings on rearwardly-extended portions of said side bars, and supporting-wheels the axle of which is designed for engaging in said rear bearings.

In testimony whereof I have signed my name to this specification in the presence of two subscribing witnesses.

WALTER CLARENCE STEVENS.

Witnesses:
A. C. STEARNS,
ARTHUR HILL.